United States Patent [19]

Sedlak et al.

[11] 4,294,608
[45] Oct. 13, 1981

[54] CATALYTIC ALLOYS

[75] Inventors: John M. Sedlak, Andover, Mass.; Richard J. Lawrance, Hampstead, N.H.

[73] Assignee: General Electric Company, Wilmington, Mass.

[21] Appl. No.: 134,853

[22] Filed: Mar. 27, 1980

[51] Int. Cl.³ .............................................. C22B 61/00
[52] U.S. Cl. .............................. 75/0.5 A; 75/0.5 AA; 75/0.5 AB; 75/251
[58] Field of Search ......... 75/0.5 A, 0.5 AA, 0.5 AB, 75/251

[56] References Cited

U.S. PATENT DOCUMENTS

| | | | |
|---|---|---|---|
| 3,183,124 | 5/1965 | Jasinski | 429/13 |
| 3,287,171 | 11/1966 | Holt | 252/472 |
| 3,297,484 | 1/1967 | Niedrach | 429/42 |
| 3,369,886 | 2/1968 | Metzger et al. | 75/0.5 A |
| 3,423,228 | 1/1969 | Oster et al. | 427/164 |
| 3,513,028 | 5/1970 | Salomon | 429/44 |
| 3,524,899 | 8/1970 | Candlin et al. | 252/428 |
| 3,562,008 | 2/1971 | Martinsons | 427/126.5 |
| 3,814,696 | 6/1974 | Verdone et al. | 252/317 |
| 4,039,409 | 8/1977 | Laconti et al. | 204/129 |

OTHER PUBLICATIONS

Ventron Publication; Carter et al., J. Catal. 20, 223 (1971) and McKee et al., J. Phys. Chem., 68, 481 (1964).

*Primary Examiner*—W. Stallard
*Attorney, Agent, or Firm*—I. David Blumenfeld

[57] ABSTRACT

A method of making substantially oxide-free metal alloys is described. The alloys are made by a hot alkaline reduction of compounds of at least two metals, such as the halides of the metals dissolved in an aqueous medium containing a reducing agent. The dissolved metal compounds containing a first reducing agent are added to a second reducing agent, in a alkaline medium, and the substantially oxide-free, finely-divided alloy precipitates from solution. The alloy has a unique X-ray diffraction pattern indicating that it is a true alloy with no metal oxides present. In a preferred embodiment, ruthenium and platinum chlorides are dissolved in water containing a dissolved reducing agent. This solution is added to a second reducing agent in an alkaline medium at elevated temperatures, and a finely-divided black precipitate of a true alloy of ruthenium and platinum forms. The X-ray diffraction pattern shows a distorted ruthenium structure having platinum in solid solution. Oxygen evolution catalysis was substantially improved in an electrochemical cell having a catalytic cathode made of this alloy of platinum and ruthenium.

21 Claims, 2 Drawing Figures

CATALYTIC ALLOYS

This invention relates generally to a method of producing finely-divided metal alloys, the alloy compositions made therefrom and to catalytic electrode compositions for use in electrochemical cells. More particularly the invention relates to alloys made by the hot alkaline reduction of metal compounds.

Numerous methods for producing finely-divided metals for use in various catalytic processes are well known in the art. It is well known to reduce the metal from a solution of a salt of the metal with an alkali metal dissolved in an organic solvent, by the reduction of metal from an aqueous solution with an alkali metal borohydride, by the high temperature reduction of metal with hydrogen and/or carbon monoxide, and by the reduction of metal from a salt of the metal dissolved in a suitable solvent in the presence of an aluminum compound so that the reduction of the metal and precipitation of aluminum hydroxide occur simultaneously as described in U.S. Pat. No. 3,369,886.

Aqueous solutions of the platinum-metal compounds may be reduced by treatment with an aqueous solution of sodium borohydride or hydrazine, with the precipitation of finely-divided metal. For example, a platinum-ruthenium alloy powder may be precipitated by starting with a mixed solution of ruthenium trichloride (hydrate) and chloroplatinic acid hexahydrate to produce a platinum-ruthenium alloy powder. The reduction of the mixed solution is carried out by adding a 5% by weight solution of sodium borohydride dropwise to a stirred, mixed solution of the platinum and ruthenium salts. Alternatively, an 85 weight percent solution of hydrazine hydrate may be used, but in this case the reaction is more vigorous, and coagulation of the precipitated metal does not occur so readily. However, the finely-divided metal particles prepared in this manner are heavily oxide covered.

One of the major disadvantages of the finely-divided metals prepared in accordance with the known processes, is the formation of oxides during the reduction step either upon the surface of the alloy or distributed throughout the alloy. Another disadvantage is the vigorous reaction rate at which the reduction of the metal takes place in certain cases and the difficulty of controlling the reaction rate when large quantities are produced, or alternatively certain of the reduction reactions are comparatively slow and consume substantial time for the production of the finely-divided metal. Furthermore, true alloys, that is, one or more metals dissolved in another metal, cannot be made by these prior art methods. Many of the prior art methods result in the production of a two-phase system with only minor amounts of one of the metals of the alloy dissolved in the other metal phase.

One of the prior art methods of preparing finely-divided metals for catalytic processes and electrodes, is the Adams method referred to in U.S. Pat. No. 4,039,409. In the Adams method, finely-divided halide salts of platinum (in the form of chloroplatinic acid) and ruthenium (in the form of ruthenium chloride) are mixed in the same weight ratio of platinum and ruthenium desired in the final alloy. An excess of sodium nitrate is incorporated, and the mixture is fused in a silica dish at 500° C. for three hours. The residue is then washed thoroughly to remove the soluble nitrates and halide salts present, leaving a residue of platinum/ruthenium oxide. The resulting suspension of mixed oxides is then reduced at room temperature by bubbling hydrogen therethrough or by using an electrochemical reduction technique, i.e., electrochemical reduction in acid media. This product which is a reduced platinum/ruthenium alloy is dried thoroughly as by the use of a heat lamp, ground and then sieved through a 400 mesh nylon screen. Although many commercial catalytic materials are prepared in accordance with the Adams method, several of the disadvantages enumerated above are also applicable to this method.

It is the principal object of this invention to provide an improved method for making finely-divided metal alloys.

It is another object of this invention to provide improved, finely-divided metal alloys which are especially useful in catalytic processes.

Another object of the present invention is to provide a method of preparing finely-divided metal alloys which are substantially or completely free of oxides of the metals.

Still another object of this invention is to provide finely-divided metal alloys which are substantially or completely free of oxides of the metals.

Another object of the present invention is to provide a method of preparing finely-divided metal alloys wherein a precipitate of the finely-divided alloy is quickly formed by a reaction which is easily controlled.

Another object of this invention is to provide a method of preparing a true, homogeneous metal alloy wherein at least one metal is dissolved in another metal in the form of a solid solution.

These and other objects of the invention are accomplished by the steps of (a) mixing in aqueous solution the water soluble salts of at least two metals and a first reducing agent in an amount and under conditions insufficient to reduce the metal salts in solution;

(b) adding the aqueous solution of metal salts containing the first reducing agent to a caustic solution of a second reducing agent present in an amount sufficient to cause the reduction of the dissolved metal salts at elevated temperatures, whereby a precipitate of alloy of the metals in the metal salts forms in the solution; and, (c) separating the precipitate from the solution.

In an additional step, the precipitate may be washed with water or other suitable solvents and dried.

In accordance with the present invention, there is also provided a finely-divided metal alloy made by the steps of (a) mixing an aqueous solution of water soluble salts of at least two metals and a first reducing agent in an amount and under conditions insufficient to reduce the metal salts in solution;

(b) adding the aqueous solution of metal salts containing the first reducing agent to a caustic solution of a second reducing agent present in an amount sufficient to cause the reduction of the dissolved metal salts at elevated temperatures, whereby a precipitate of alloy of the metals in the metal salts forms in the solution; and, (c) separating the precipitate from the solution.

In a preferred class of finely-divided alloys made in accordance with the present invention, there has been discovered a finely-divided alloy of ruthenium with at least one other metal comprising a solid solution of said other metal dissolved in ruthenium substantially free of the oxides of other metals and ruthenium, said alloy being coprecipitated from the dissolved salts of ruthenium and said other metal having a d-spacing (lattice spacing) approximately the same as the lattice spacing of pure ruthenium. The alloys of the present invention also have the hexagonal symmetry of ruthenium.

When finely-divided alloys were made in accordance with the process of the present invention, it was surprisingly discovered that they were substantially or completely free of oxides of the metals. Furthermore, it was also discovered that the alloys made in accordance with the present invention are completely homogeneous, and there is a true solid solution of one or more metals in at least one other metal. Furthermore, in accordance with the present invention, it has also been discovered that the particle size of the alloy precipitated by the hot alkaline reduction method of the present invention has a substantially improved particle size over those prepared in accordance with other prior art methods. In accordance with the present invention, the particle size is generally within a range of 50–100 Angstrom units.

When ruthenium alloys were made from a salt or salts of ruthenium in accordance with the hot alkaline reduction method of the present invention, it was discovered that the other metal or metals used to form the alloy with ruthenium dissolved in ruthenium to form a true solid solution. For example, under prior art techniques, normally ruthenium dissolves into a platinum structure even when amounts up to or greater than 66% by weight ruthenium is used to form the alloy. However, in accordance with the process of the present invention, the platinum dissolves into a ruthenium structure. The metal alloys prepared in accordance with the present invention and used as electrodes in water electrolysis had an improved Tafel slope over the prior art platinum and ruthenium oxide electrodes.

The invention may be better understood by reference to the following description, taken in connection with the photographs used herein.

Figure 1:
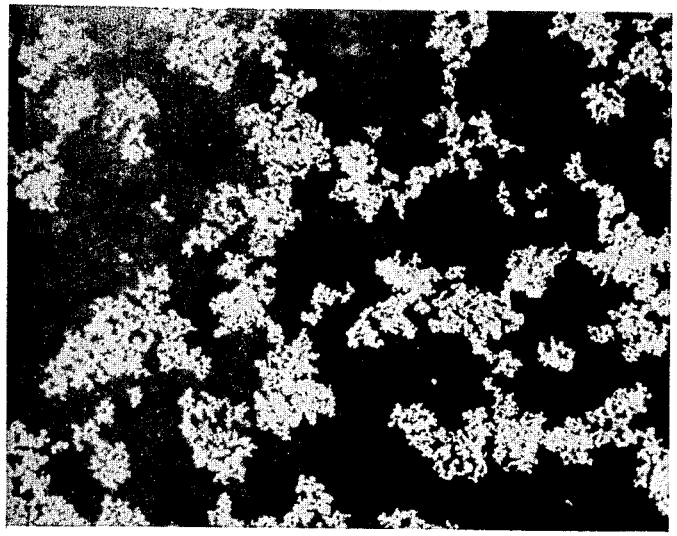
FIG. 1 is a transmission electron micrograph of a ruthenium-platinum alloy made in accordance with the present invention.
Figure 2:
FIG. 2 is a transmission electron micrograph of a ruthenium-tantalum-iridium alloy made by the Adams process.

The photographs in FIGS. 1 and 2 are transmission electron micrographs having a magnification of 34,500× and are useful to obtain particle sizes of the finely-divided alloys. In the photographs, the white areas represent the particles of alloy and the dark areas represent background. In FIG. 1, the finely-divided particles of ruthenium-zirconium alloy prepared by the hot alkaline reduction process of the present invention range from about 50–100 Angstrom units in size. The X-ray diffraction line breadth, reported below, is primarily attributable to small crystallite size.

In FIG. 2, the transmission electron micrograph was taken of a ruthenium-iridium-tantalum alloy prepared by the Adams process. The particles appear to represent crystals having a widely variable size ranging from about 50–500 Angstrom units.

In accordance with the present invention, finely-divided metal alloys are prepared by a hot alkaline reduction technique using a first and second reducing agent. Finely-divided metal alloys are generally considered to be those having a particle size of about 25–150 Angstrom units and more preferably from about 50–100 Angstrom units. The metal alloys made in accordance with the present invention are finely-divided because of the process by which the metal alloys are precipitated from solution in the hot alkaline reduction technique. Generally, the finely-divided metal alloys made in accordance with the present invention have a very large surface area substantially or completely free of oxides. This has been determined by product yields and by X-Ray diffraction discussed below.

The finely-divided metal alloys of the present invention are prepared from the salts of the metals which form the alloy. Thus, the salts of at least two different metals must be used to prepare the finely-divided metal alloys. The salts of the metals used to form the finely-divided metal alloys in the present invention must be water-soluble. The salts of the metals can be partially or completely soluble in water. In the preferred embodiments of the present invention, the salts of the metals are completely soluble in water. Any undissolved salt of a metal should be removed from the aqueous medium prior to initiating the reduction reaction so that the precipitated finely-divided metal alloy product does not become mixed with the undissolved salt of the metal. In certain cases the solubility of the salt of a metal may be increased by increasing the temperature of the aqueous medium, and the aqueous solution may be heated to promote dissolution of a salt or salts. The aqueous medium may also include other solvents which do not interfere with the hot alkaline reduction technique of making the finely-divided metal alloy.

The salts of at least any two different metals may be used in the process of the present invention so long as the particular salts are partially or completely soluble in water. An aqueous solution of the salts of the metals can be formed for use in the first step of the process of the present invention. The preferred salts of the metals are those selected from the group consisting of Groups IV-B, V-B, VI-B, VII-B, VIII, I-B, II-B, III-B, IV-A and V-A of the Periodic Chart of the Elements. This includes the salts of such metals as titanium, zirconium, vanadium, niobium, chromium, molybdenum, tungsten, manganese, rhenium, ruthenium, osmium, cobalt, rhodium, iridium, nickel, palladium, platinum, copper, silver, gold, zinc, cadmium, yttrium, tin, lead and the like.

The salts of the metals used to make the finely-divided metal alloys of the present invention and used in the process of the present invention, may be any salt which is water-soluble, that is, any metal salt which is partially or completely water-soluble. Naturally, complete solubility of the salt of the metal in the aqueous medium is preferred to preclude the removal of any undissolved salt of the metal from the aqueous medium prior to or subsequent to the precipitation of the metal alloy formed in the hot alkaline reduction reaction. Preferred salts of the metals include the halides, such as chlorides, bromides, iodides and fluorides; sulfates; sulfites; acetates; nitrates; perchlorates and the like. However, salts of nitrates and perchlorates may be extremely reactive, and generally such salts are not preferred in the preparation of the finely-divided metal alloys of the present invention. Almost any salt which is water-soluble; which does not cause, or can be controlled to the extent that it does not cause, any explosive reaction; which does not cause the precipitation of the oxide form of the metal in the alloy; and which is capable of forming an alloy with another metal salt in the aqueous solution, may be used in accordance with the present invention. Other specific salts may include various platinum metal halide salts such as chloroplatinic acid, chloropalladic acid, and the like, the sodium, lithium and alkaline earth platinum metal halides, such as, for example, sodium chloroplatinate, lithium chloroplatinate, the alkaline earth chloroplatinates, and the like, ammonium tetrachloropalladate, rhodium trichloride (hydrate), ruthenium trichloride (hydrate), chloroplatinic acid hexahydrate, sodium perrhenate, potassium perrhenate, rhenium trichloride, ammonium platino nitrate, barium platino cyanide, sodium bromoplatinate, potassium iodoplatinate, platinum tetrachloride, and the like. Many of the salts of the metals used in accordance with the present invention may be in a hydrated form.

The concentration of the salts of the metals in the aqueous solution is not critical in the practice of the present invention. The metal salts must be reduced in combination, that is, the salts of two or more different metals must be dissolved to form an aqueous solution in order to provide a precipitate comprising the two or more elements, that is, the alloy. The resulting precipitate is the metal alloy wherein each of the metals is in the zero valence state. Thus, the hot alkaline reduction of ruthenium trichloride and hexachloroplatinic acid in an aqueous solution produced an alloy of ruthenium and platinum. Generally, the mixture of the salts of the two or more metals is present in the aqueous solution in the same weight ratio desired in the alloy. Within the limits of solubility, any concentration of the salts of two or more metals may be used in the process of the present invention to make the alloys of the present invention. For example, to make a 50% by weight ruthenium-50% by weight platinum alloy in accordance with the present invention, one skilled in the art must use enough ruthenium trichloride and enough hexachloroplatinic acid to give one gram of ruthenium metal per every gram of platinum metal. To make a 10% platinum-90% ruthenium alloy, for every 0.1 gram of Pt in the form of hexachloroplatinic acid dissolved in water, 0.9 grams of Ru in the form of ruthenium trichloride must be dissolved in the water. Although it is not critical, generally about 0.25 gram to about 15 grams of the salts of at least two metals are dissolved (depending upon solubility of the salts) in 50 mls. of water to make the aqueous solution. Although the concentration of the salts of the two or more metals in the aqueous solution is not critical, it is generally recommended that the concentration of the salts in the water is such that there is no substantial dilution of the caustic or alkali used in the reducing step. Dilution of the caustic or alkali may cause the reducing to proceed at too low a rate.

To the aqueous solution containing the salts of at least two metals, there is added and mixed a first reducing agent. In this step, when the first reducing agent is mixed with the aqueous solution of the water soluble salts of at least two metals (two or more metals), conditions should be such that there is no reaction, that is, no reduction, of the metal salts during the mixing step.

When the first reducing agent is mixed in the aqueous solution of the water-soluble salts of two or more metals, it is mixed in an amount insufficient to reduce the metal salts in solution and under conditions wherein the reduction of the metal salts does not occur. For example, if the reducing agent is one which reduced the salt of a metal under caustic or alkaline conditions, then the aqueous solution of water-soluble salts of two or more metals must remain substantially neutral or acidic. However, with many reducing agents such as formaldehyde and other aldehydes, hydrazine and the like, a caustic or alkaline medium is required for the reduction of a metal salt. Thus, if the aqueous solution of the water-soluble salts of at least two metals is maintained in a substantially neutral or acidic state, that is, at a pH of 7.0 or below, there will be no reduction of the aqueous solution of the two or more metals. Accordingly, any alkaline or caustic medium should be avoided when the first reducing agent is mixed with the aqueous solution of the water-soluble salts of at least two metals.

As indicated above, the concentration of the first reducing agent is also sufficiently low to prevent the chemical reduction of the metal salts at this stage of the process. Thus, the first reducing agent, for example, formaldehyde, is mixed with the aqueous solution of the water-soluble salts of two or more metals in an amount or concentration insufficient to reduce the metal salts in solution. Furthermore, the aqueous solution is generally maintained at room temperature or at temperatures below which the reduction of the metal salts takes place in the presence of a reducing agent. Accordingly, if the first reducing agent is effective at temperatures above 50° C., then the aqueous solution is maintained at a temperature at or below 50° C. to prevent the reduction of the metal salts. In certain cases, it may be necessary to cool the aqueous solution before adding the first reducing agent thereto. Generally, maintaining the aqueous solution at a temperature below which the reduction reaction takes place with the first reducing agent, or using an amount or concentration of first reducing agent which is insufficient to reduce the metal salts in solution, or maintaining the aqueous solution containing the first reducing agent at a pH of 7.0 or below, or any combination of the foregoing, may be defined herein as conditions which are insufficient to reduce the metal salts in solution. Thus, the first step of making a finely-divided metal alloy generally comprises mixing in aqueous solution the water-soluble salts of at least two metals and a first reducing agent under conditions insufficient to reduce the metal salts in solution.

The reducing agents which may be used as a first reducing agent or as a second reducing agent include any of the well-known reducing agents which may be used to reduce the salts of metals to their zero valence state. One skilled in the art can easily determine conventional reducing agents which may be used in accordance with the present invention wherein a first reducing agent is mixed with the salts of at least two metals under conditions which will not reduce the metal salts in aqueous solution and a second reducing agent is thereafter used to reduce the metal salt in the aqueous solution containing a first reducing agent in a caustic or alkaline medium at elevated temperatures. Typical reducing agents include various aldehydes, such as acetaldehyde, formaldehyde, propionaldehyde, and the like; ketones such as acetone; alchols such as methanol, and the like.

Other specific examples of reducing agents include hydrazine, hydroquinone, diborane, isopropanol, hydroxylamine, propanol, sodium borohydride, methyl magnesium halide, hypophosphorus acid, sulfur dioxide, metal alkyls, silanes, and the like.

The first and second reducing agents used in accordance with the present invention may be mixtures of reducing agents, may be the same reducing agent, or may be different reducing agents. In accordance with the present invention, the most preferred combination of reducing agents is formaldehyde as a first reducing agent and hydrazine as a second reducing agent. Generally, when formaldehyde is used as a first reducing agent, a 37% formaldehyde in water is mixed with the aqueous solution of water-soluble salts of two or more metals. In one preferred embodiment, about 1.0 ml of 37% formaldehyde in water solution is mixed with the aqueous solution of water-soluble salts of two or more metals for each gram of metal salt in solution. The amount of first reducing agent is not critical so long as the amount is maintained at a concentration insufficient to reduce the metal salts in aqueous solution prior to the step of adding the aqueous solution of metal salts containing the first reducing agent to the caustic solution of a second reducing agent.

After the first reducing agent is mixed with the aqueous solution of the water-soluble salts of two or more metals in an amount (concentration) insufficient to reduce the metal salts in solution, at a suitable temperature which is below that temperature which is required to cause the first reducing agent to reduce the metal salts dissolved in the aqueous solution and at a pH of 7.0 or less, it is added to a caustic or alkaline solution of a second reducing agent present in an amount sufficient to cause the reduction of the dissolved metal salts at elevated temperatures, whereby a precipitate of alloy of the metals formed in the solution. Generally the precipitate settles in the aqueous medium, and the aqueous medium can be decanted from the settled precipitate. However, any suitable separation of the precipitate from the solution can be carried out by one skilled in the art. For example, various automated settling techniques can be used; various filtration techniques can be used; or various centrifugation techniques can be used to separate the precipitate from the solution or aqueous medium.

The aqueous solution of metal salts containing the first reducing agent is generally added to the caustic solution of the second reducing agent by controlled means. The control of the addition to the caustic solution of the second reducing agent depends upon the rate of reaction. One skilled in the art can determine the amount of control required for the addition of the aqueous solution of metal salts containing the first reducing agent to the caustic solution of the second reducing agent. Such factors as the temperature of the aqueous solution of metal salts containing the first reducing agent, the temperature of the caustic solution of the second reducing agent, the concentration of the first reducing agent, the concentration of the second reducing agent, and the reactivities of the reducing agents must be considered. In order to determine the amount of control required for the addition of the aqueous solution of metal salts containing the first reducing agent to the caustic solution of the second reducing agent, one can simply begin the addition by a drop-wise technique and increase the rate of addition of the aqueous solution of metal salts containing the first reducing agent to the caustic solution of the second reducing agent to the point where optimum reaction conditions prevail. As pointed out above, the control of the addition of the aqueous solution of metal salts containing the first reducing agent to the caustic solution of the second reducing agent can be dangerous if the reaction is too vigorous.

The caustic solution of the second reducing agent is generally an aqueous or water-based solution. As used herein, caustic and alkaline may be used interchangeably, and generally refers to a solution wherein the pH is maintained between about 7.1 and 14, and more preferably from about 8.0 to 12.0. Any suitable material may be used to prepare the caustic solution of the second reducing agent. One of the preferred agents for maintaining the solution of the second reducing agent caustic or alkaline is 20–50 weight % sodium hydroxide. Other suitable agents which may be used to maintain the solution of the second reducing agent caustic or alkaline, that is, at a pH greater than 7.0, are potassium hydroxide, lithium hydroxide, cesium hydroxide, or any of the other alkali metal hydroxides. Sodium carbonate may also be used for maintaining a caustic solution of the second reducing agent. One skilled in the art can determine any suitable agent for preparing a caustic solution of the second reducing agent. Furthermore, the concentration of the caustic is not a critical parameter in the process of the present invention and one skilled in the art can determine the optimum concentration of caustic or alkaline material which may be used in the solution of the second reducing agent to maintain the pH of the solution containing the second reducing agent at a pH greater than 7.0. A 50% grade of sodium hydroxide is generally preferred because it is a commercial grade, and because in preferred embodiments of the present invention, the optimum concentration is relatively high.

As discussed above, the use of an alkaline reducing agent is critical in the process of the present invention. The reducing agents which may be used as the second reducing agent, have been discussed in the list above. The amount of reducing agent must be that amount which is sufficient to cause the reduction of the dissolved metal salts at elevated temperatures and varies, depending upon the metal salts being reduced, the temperature of the solution and the particular reducing agent or reducing agents being used. In preferred embodiments, a 0.04% solution of second reducing agent is generally sufficient to cause the reduction of the dissolved metal salts at elevated temperatures. A general range for the concentration of the second reducing agent in the caustic solution is about 0.025% by weight of the metal being reduced up to about 15% by weight based upon the weight of the metal being reduced. Although higher concentrations may be used to reduce the dissolved metal salts to the zero valence state of the metals, greater concentrations of the second reducing agent do not improve the reduction reaction. In a continuous reaction mode, it is necessary to replenish the second reducing agent to provide an amount sufficient to cause the reduction of additional dissolved metal salts at elevated temperatures.

The elevated temperatures at which the addition of the aqueous solution of metal salts containing the first reducing agent to the caustic solution of the second reducing agent is carried out, is generally about 80° C. or higher. A preferred temperature range is about 120° C. to about 155° C. No improvement in reaction conditions or in yield is realized at temperatures greater than about 155° C. At temperatures below about 120° C. the reaction becomes slow, and although the dissolved metal salts are reduced at temperatures below 120° C. the reaction is generally considered to be too slow for practical purposes.

One of the preferred, finely-divided metal alloys of ruthenium in accordance with the present invention is an alloy of ruthenium and platinum made by the steps of: (a) mixing in aqueous solution ruthenium trichloride and hexachloroplatinic acid and formaldehyde under conditions insufficient to reduce the ruthenium trichloride and hexachloroplatinic acid; (b) adding the aqueous solution of ruthenium trichloride, hexachloroplatinic acid and formaldehyde to an alkaline or caustic solution of hydrazine present in an amount sufficient to cause the reduction of the hexachloroplatinic acid and ruthenium trichloride at elevated temperatures, whereby a precipitate of an alloy of ruthenium and platinum forms in the solution; and (c) separating the precipitate of ruthenium-platinum alloy from the solution. The precipitate of ruthenium-platinum alloy is then washed with water and dried. The caustic solution was a 50% sodium hydroxide in water solution.

In accordance with the present invention, the precipitate of metal alloy may be washed with water or any other suitable solvent and dried. If soluble salts precipitate with the metal alloy or are present in the metal alloy, the metal alloy may be washed with water or other suitable solvent until any soluble salts are removed therefrom.

When the process of the present invention is carried out using a water-soluble salt of ruthenium and at least one other water-soluble metal salt, such as hexachloroplatinic acid, an alloy of the ruthenium and at least one other metal salt is formed as a solid solution of the at least one other metal dissolved in ruthenium substantially free of the oxides of ruthenium and the other metal. The alloy has a d-spacing of about 2.34 Angstrom units substantially the same d-spacing as pure ruthenium at the 100 hkl reflection and a hexagonal symmetry greater than $c_o=$about 4.28 Angstrom units as measured with copper-potassium alpha radiation in X-ray powder diffraction. When the finely-divided alloy is platinum and ruthenium made in accordance with the process of the present invention and the d-spacing (lattice spacing) of the alloy is about 2.35 Angstrom units, substantially the same d-spacing as pure ruthenium at the 100 hkl reflection and has a hexagonal symmetry of about 4.40 Angstrom units as opposed to the face centered cubic symmetry for platinum. When the finely-divided alloy is zirconium and ruthenium made in accordance with the process of the present invention, the alloy is a solid solution of zirconium dissolved in ruthenium substantially free of the oxides of zirconium and ruthenium and having a d-spacing (lattice spacing) of about 2.37 Angstrom units substantially the same d-spacing as pure ruthenium at the 100 hkl reflection and having a hexagonal symmetry greater than $c_o=$about 4.28 Angstrom units. When the finely-divided alloy is ruthenium, tantalum and iridium made in accordance with the process of the present invention, the alloy is a solid solution of tantalum and iridium dissolved in ruthenium substantially free of the oxides of ruthenium, tantalum and iridium and having a d-spacing (lattice spacing) of about 2.33 Angstrom units substantially the same d-spacing (lattice spacing) as pure ruthenium. Thus, in accordance with the present invention, when the lattice spacing or d-spacing is the same as ruthenium or when it approximates that of ruthenium, for example when it is even within several hundredths Angstrom units of the d-spacing of ruthenium, the alloy is a solid solution of the second metal or metals dissolved in ruthenium.

According to the present invention and in accordance with the foregoing measurements, there is provided a finely-divided alloy of ruthenium and at least one second metal comprising a solid solution of the second metal dissolved in ruthenium substantially free of the oxides of the second metal and ruthenium, said alloy being coprecipitated from the dissolved salts of ruthenium and the second metal and having a lattice spacing (d-spacing) of the same or of about the same magnitude as the lattice spacing of ruthenium, Contrary to usual prior art alloys, the second metal or metals are dissolved in the ruthenium, as evidenced by the lattice spacing measurements, when the alloys are made by the process of the present invention. Furthermore, the finely-divided metal alloys containing ruthenium made by the present invention have the hexagonal symmetry of ruthenium. Thus, there is a finely-divided alloy of ruthenium and at least one second metal comprising a solid solution of the second metal dissolved in ruthenium substantially free of the oxides of the second metal and ruthenium, said alloy being coprecipitated from the dissolved salts of ruthenium and the second metal or metals and having the hexagonal symmetry of ruthenium.

The finely-divided metal alloys produced in accordance with the present invention can be used as catalysts in chemical reactions such as polymerization, hydrogenation, dehydrogenation, electrochemical oxidation or reduction reactions, and as accelerators or promotors in chemical reactions. The materials can also be used to impart properities to other chemical compounds such as mixing with liquids before polymerization to form metalized polymers or as pigments in coating materials such as in ceramics or paints. They can also be used as catalytic materials in fuel cells and are especially useful for water electrolysis.

The following examples are presented for purposes of illustration only, and the details therein should not be construed as limitations upon the true scope of the invention as set forth in the claims.

EXAMPLE 1

A ruthenium-platinum alloy was prepared by forming an aqueous solution of equal amounts of ruthenium trichloride and hexachloroplatinic acid. About 1 ml of a 37% aqueous formaldehyde solution was added per each gram of metal dissolved in the water. To a 50% solution of sodium hydroxide was added a 64% solution of hydrazine in water in a proportion of 1 ml of the 64% hydrazine in water solution per every 100 mls of sodium hydroxide solution. This alkaline hydrazine solution was heated at about 120°–140° C. and stirred. The solution of ruthenium trichloride and hexachloroplatinic acid containing formaldehyde was added drop-wise to the heated, alkaline hydrazine solution while stirring. A fine black precipitate formed instantaneously in the solution. After the drop-wise addition of the solution was complete, the black precipitate was separated from the solution and tested.

In three different runs, in the preparation of a 50% by weight ruthenium-50% by weight platinum alloy, the yield was 96%, 100% and 103% respectively. The yield represents the metal content of the alloy and is indicative of a pure metal alloy in which there has been no oxide formation. When oxide formation occurs, the percent yield is considerably higher, generally within the range of approximately 115–125%. Thus, based upon the yield data, it is concluded that there is little or no oxide content and that the ruthenium-platinum alloy is substantially or completely free of oxides of ruthenium and/or platinum.

EXAMPLE 2

A sample of a 50% platinum/50% ruthenium alloy made in accordance with Example 1, was submitted for X-ray powder diffraction analysis to identify phases. The powder diffraction patterns were obtained with CuKα radiation. The X-ray powder diffraction data is shown below in Table 1.

TABLE 1

X-Ray Powder Diffraction Data
50% Ruthenium/50% Platinum Alloy

| Observed Data | | Standard Ru (Ruthenium) Data | | |
|---|---|---|---|---|
| d(Å) | I* | d(Å) | I/I | (hkl) |
| 2.35 | W (B) | 2.343 | 40 | 100 |
| 2.20 | M (B) | 2.142 | 35 | 002 |
| 2.07 | M (B) | 2.056 | 100 | 101 |
|  |  | (1.5808) | 25 | 102 |
| 1.36 | W (B) | 1.3530 | 25 | 110 |
| 1.25 | VW (VB) | 1.2189 | 25 | 103 |
| 1.15 | W (VB) | 1.1434 | 25 | 112 |
|  |  | 1.1299 | 20 | 201 |
|  |  |  | I ≧ 20 |  |

*S = strong
M = medium
W = weak
V = very

The diffraction lines were assigned to a phase having the ruthenium structure. Ruthenium has hexagonal symmetry with $a_o=2.706$ Å and $c_o=4.282$ Å (Å represents Angstrom units). The (100) reflection had essentially the same d-spacing as ruthenium. However, the (002) reflection has a small d-spacing of 2.20 Å, although the exact position was a little uncertain because of line breadth. This indicated a $c_o$ parameter of 4.40 Å, substantially greater than for pure ruthenium. For this reason, it is believed that the ruthenium-type phase was a ruthenium/platinum solid solution. The diffraction lines were very broad, indicating small crystallite size and/or an inhomogeneous lattice strain field from local compositional inhomogeneity.

The transmission electron micrograph of the powder sample made in accordance with Example 1 and comprising a 50% ruthenium/50% platinum alloy is shown in the photograph in FIG. 1. The micrograph shows aggregates of basic particles having a size of about 50-100 Angstrom units.

Equal amounts of the metal salts were used to form the 50% ruthenium/50% platinum metal alloy. The X-ray diffraction data for the metal alloy shows lines substantially the same as those of ruthenium. Since there are no lines for the platinum structure even though equal amounts of platinum and ruthenium were used, it is clearly indicative that the platinum is dissolved in the ruthenium. Furthermore, the data on the alloy shows nothing but the hexagonal structure of the ruthenium. The face centered cubic symmetry of platinum is not present in the Pt/Ru alloy made by the process of this invention, indicative of the fact that the platinum is dissolved in the ruthenium.

EXAMPLE 3

A 70% platinum/30% ruthenium alloy was made by the prior art method discussed above and known as the Adams method. The Adams method is disclosed in U.S. Pat. No. 4,039,409. Thermally decomposible ruthenium chloride was added to an appropriate quantity of chloroplatinic acid and an excess of sodium nitrate. The Adams method of platinum preparation is disclosed by R. Adams and R. L. Shriner in the Journal of American Electrochemical Society, Volume 45, page 2171, (1923). The platinum and ruthenium salts were mixed in the same weight ratio of platinum and ruthenium desired in the final alloy. An excess of sodium nitrate was incorporated and the mixture was fused in a silica dish at 500° C. for three hours. The residue was then washed thoroughly to remove soluble nitrates and halide salts present leaving a water-insoluble residue of platinum-ruthenium oxide. The resulting suspension of mixed oxides was reduced at room temperature by using an electrochemical reduction technique, that is, electrochemical reduction in acid media. The product was a reduced platinum-ruthenium alloy and was dried thoroughly by the use of a heat lamp, ground or pulverized and then sieved through a 400 mesh nylon screen.

The ruthenium-platinum alloy prepared in accordance with the foregoing Adams process was submitted for X-ray powder diffraction analysis. The sample showed a sharp diffraction line at 4.8 Angstrom units, possibly due to Teflon in the sample. All other lines were very broad, indicating small crystallite size and/or alloying inhomogeneity. Oxide lines were as broad as alloy lines. The results are pointed out in Table 2 below. The sample showed a major phase having cubic structure and isomorphous with platinum. The lattice parameter ($a_o=3.905$ A) suggested that about 8 weight percent ruthenium was alloyed with platinum. An oxide isomorphous with ruthenium oxide was a minor constituent. Since β-platinum oxide has an orthorhombic structure pseudo-isomorphous with ruthenium oxide (tetragonal structure), it was believed that the oxide was ruthenium oxide with limited replacement of ruthenium by platinum.

TABLE 2

X-ray Powder Diffraction Pattern
70% Platinum/30% Ruthenium
(Made by Adams Process)

| Observed Data | I/I$_1$* | Pt/Ru d** | hkl | I/I$_1$ | RuO$_2$ d | hkl |
|---|---|---|---|---|---|---|
| W | 4.75 | sharp | line | possibly |  from | Teflon |
| VW(b) | 3.20 |  |  | 100 | 3.17 | (100) |
| VW(b) | 2.52 |  |  | 50 | 2.550 | (101) |
| S(b) | 2.23 | 100 | 2.25 | (111) | 10 | 2.243 | (200) |
| W(b) | 1.95 | 53 | 1.95 | (200) |  |  |
| VW(b) | 1.68 |  |  |  | 30 | 1.685 | (211) |
| M(b) | 1.38 | 31 | 1.381 | (220) |  |  |
| M(b) | 1.177 | 33 | 1.177 | (311) |  |  |
| VW(b) | 1.130 | 12 | 1.127 | (222) |  |  |
|  |  |  |  | I ≧ 10 |  |  |

*Intensities for pure platinum
**Calculated for F.C.C. lattice with $a_o$ = 3.905 Å, corresponds to ~ 14 at % Ru or 7.8 wt % Ru isomorphous with Pt.
W = weak
V = Very
S = strong
M = medium

EXAMPLE 4

A ruthenium-tantalum-iridium alloy was prepared by the Adams method as described in Example 3 above and starting with the respective chlorides of ruthenium, tantalum and iridium. The X-ray powder diffraction analysis showed broad diffraction lines with a pattern corresponding to ruthenium oxide. Single symmetrical lines were found which indicated that tantalum oxide was not present as a separate entity providing that the amount of the tantalum was not exceeded by about 5% by weight. Results indicated that the sample was either the oxides of ruthenium, iridium and tantalum or a mixture of ruthenium oxide and iridium oxide, each potentially having tantalum oxide in solid solution. The X-ray powder diffraction data for this sample is shown in Table 3 below.

TABLE 3

X-Ray Powder Diffraction Data
Ruthenium-Tantalum-Iridium Alloy
(By Adams Method)

| Observed Data | | RuO$_2$ | | IrO$_2$ | | TaO$_2$ | |
|---|---|---|---|---|---|---|---|
| d(A) | I* | d(A) | I/I$_1$ | d(A) | I/I$_1$ | d(A) | I/I$_1$ |
| 3.19 | S | 3.17 | 100 | 3.178 | 100 | 3.34 | 100 |
| 2.56 | S | 2.55 | 50 | 2.582 | 90 | 2.578 | 70 |
| 2.24 | W | 2.243 | 10 | 2.2488 | 25 | 2.358 | 50 |
| | | 2.217 | 4 | | | | |
| 1.69 | M | 1.685 | 30 | 1.6960 | 55 | 1.739 | 50 |
| 1.60 | VW | 1.586 | 9 | 1.5903 | 12 | 1.668 | 10 |
| 1.55 | VW | 1.552 | 4 | 1.5771 | 6 | 1.535 | 10 |
| 1.43 | VVW | 1.4230 | 5 | 1.4227 | 12 | 1.492 | 10 |
| 1.395 | VW | 1.3943 | 5 | 1.4133 | 14 | 1.400 | 20 |
| 1.350 | VW | 1.3491 | 5 | 1.3542 | 14 | | |
| 1.285 | VVW | 1.2770 | 2 | 1.2914 | 8 | | |
| 1.160 | VVW | 1.1559 | 4 | 1.1604 | 10 | | |
| 1.118 | VVW | 1.1230 | <1 | 1.1247 | 4 | | |
| | | | | 1.1199 | 6 | | |

*S = Strong
M = Medium
W = Weak
V = Very

The transmission electron micrograph of this sample is shown in the photograph in FIG. 2. Many of the particles in this sample appear as crystals having a widely variable size range of about 50-500 Angstroms units.

EXAMPLE 5

A ruthenium-tantalum-iridium alloy was prepared by the alkaline reduction method of the present invention as set forth in Example 1. The chlorides of ruthenium, iridium and tantalum were used as the starting material and were dissolved in water to form an aqueous solution with formaldehyde. The X-ray powder diffraction analysis of the alloy is shown below in Table 4.

TABLE 4

X-Ray Powder Diffraction Data
Ruthenium-Tantalum-Iridium Alloy
(By Process of this Invention)

| Observed Data | | Ru | | Ta | | Ir | |
|---|---|---|---|---|---|---|---|
| d(A) | I* | d(A) | I/I$_1$ | d(A) | I/I$_1$ | d(A) | I/I$_1$ |
| 2.33 | VW | 2.343 | 40 | 2.338 | 100 | | |
| 2.15 | VW | 2.142 | 35 | | | 2.22 | 100 (not vis) |
| 2.05 | M | 2.056 | 100 | | | | |
| 1.59 | VVW | 1.5808 | 25 | 1.653 | 21 NV | 1.920 | 50 NV |
| 1.35 | VW | 1.3530 | 25 | 1.350 | 38 | 1.358 | 40 |
| 1.23 | VVW | 1.2189 | 25 | | | | |
| 1.140 | W | 1.1434 | 25 | 1.1687 | 13 NV | 1.157 | 45 |
| | | 1.1299 | 20 | | | | |

*S = strong
M = medium
W = weak
V = very

All diffraction lines in the foregoing table were attributed to ruthenium metal structure. There was no evidence of iridium metal (strongest line at 2.22 Å) or oxide. There could have been a small amount of tantalum as a descrete phase but not enough to produce a visible line at 1.653 Å (third strongest line). The data suggests a ruthenium-iridium-tantalum solid solution or a mixture of ruthenium-iridium solid solution plus a small amount of tantalum.

EXAMPLE 6

A 75% ruthenium-25% zirconium alloy was prepared in accordance with the alkaline reduction method of the present invention. The steps of Example 1 were followed starting with the respective chlorides of ruthenium and zirconium. The X-ray powder diffraction analysis of this ruthenium-zirconium alloy is shown in Table 5 below.

TABLE 5

X-Ray Powder Diffraction Data
75% Ruthenium-25% Zirconium
(By Alkaline Reduction Method)

| Observed Data | | Ru (Ruthenium) | | |
|---|---|---|---|---|
| d(A) | I* | d(A) | I/I | (hkl) |
| 2.37 | M (B) | 2.343 | 40 | 100 |
| 2.16 | W (B) | 2.142 | 35 | 002 |
| 2.07 | S (B) | 2.056 | 100 | 101 |
| 1.59 | VW (B) | 1.5808 | 25 | 102 |
| 1.36 | W (B) | 1.3530 | 25 | 110 |
| 1.23 | W (B) | 1.2189 | 25 | 103 |
| 1.14 | W (VB) | 1.434 | 25 | 112 |
| | | 1.1299 | 20 | 201 |

*S = Strong
M = Medium
W = Weak
V = Very

The diffraction lines were assigned to a phase having the ruthenium structure. Ruthenium has hexagonal symmetry with $a_o$=2.706 A and $c_o$=4.282 A. The (100) and (002) reflection d-spacings appeared to be slightly greater for the sample than for the ruthenium standard implying a slightly expanded lattice. This was not unequivocal because of the uncertainty in locating accurately the intensity maxima of the broad lines from the sample. It is believed that the diffraction pattern was from a ruthenium-zirconium solid solution. There was no evidence of diffraction lines from zirconium. There was no evidence of a ruthenium/zirconium intermetallic compound. The diffraction lines were very broad, indicating small crystallite size and/or an inhomogenous lattice strain field from local compositional inhomogeneity.

EXAMPLE 7

Ruthenium-platinum alloys, made in accordance with the alkaline reduction process of the present invention were formed into electrodes and used as oxygen evolving anodes in an electrochemical apparatus and process as described in U.S. Pat. No. 4,039,409 wherein the catalytic ruthenium-platinum alloy made by the alkaline reduction process in accordance with the present invention was placed in electrical contact with an ion exchange membrane. The oxygen was concentrated at the ruthenium-platinum alloy anode. The ruthenium-platinum alloy anode was formed as a "Teflon" bonded alloy mixture by blending the alloy with a Teflon dispersion to produce the bonded electrode structure in the manner described in U.S. Pat. No. 3,297,484, a technique well-known in the art. In the process, there is provided a catalytic cathode, the catalytic anode made of the ruthenium-platinum alloy as described above, and an ion exchange membrane is positioned between and in electrical contact with the cathode and the anode. A direct potential is provided between the cathode and the anode and water is supplied to one of the electrodes to be acted on electrochemically to evolve oxygen at the anode. The electrolytic generation of oxygen was carried out in a conventional cell as described in U.S. Pat. No. 4,039,409. The ruthenium-platinum alloy made by the alkaline reduction process of the present invention and used in the anode of the electrolytic cell had a composition of 50% by weight ruthenium and 50% by weight platinum.

An identical experiment was also carried out using an anode made of a ruthenium-platinum alloy by the prior art Adams method. Identical electrolytic cells and processes and conditions were used in both cases, except the oxygen evolving anode consisted of a platinum-ruthenium alloy made of the reduced oxides of platinum and ruthenium as described in Example 3. The catalyst cathode of the cells comprised a platinum catalyst such as platinum black. The electrolyte was a cation exchange membrane having electrodes with active areas of approximately 1/20 ft$^2$ operating in a flooded anode mode. The cells were operated at about 82° C. The comparative performance of the electrolysis units using the anode prepared from the alloy made in accordance with prior art methods is shown in Table 6 below. The table reports endurance of the anodes as cell voltage at a cell constant current of 1000 amps per ft$^2$.

TABLE 6

Comparative Cell Performance
Cell Voltage at Current of 1,000 Amps/Ft$^2$

| TIME (Hrs.) | Ru-Pt Alloy Anode Made by Alkaline Reduction (Present Invention) | Ru-Pt Alloy Made from Reduced Oxides of Ru and Pt (Adams Method) |
| --- | --- | --- |
| 0 | 1.773 | 1.742 |
| 24 | 1.804 | 1.810 |
| 48 | 1.816 | 1.918 |

It can be seen from Table 6 that the cell voltage of the cell having the ruthenium-platinum alloy anode made by the alkaline reduction process of the present invention was substantially less than the cell voltage of the cell having the anode made by the prior art process after 48 hours of oxygen evolution.

Thus, the ruthenium-platinum alloy anode made by the alkaline reduction process in accordance with the present invention is more stable as an oxygen-evolving anode than the ruthenium-platinum alloy made from the reduced oxides of ruthenium and platinum in accordance with the Adams procedure.

EXAMPLE 8

An electrolytic cell similar to the one described in Example 7 above was set up to study the stability of a 50% by weight ruthenium-50% by weight platinum alloy electrode made in accordance with the alkaline reduction method of the present invention. Using an acid electrolyte at room temperature, the ruthenium-platinum alloy electrode made by the alkaline reduction process of the present invention was held at 1.80 volts for 5.2 hours. The current remained constant at 355 milliamps for the 5.2 hours.

Under the same conditions, a ruthenium oxide electrode degraded severely over a 3 hour period.

In another experiment using a ruthenium-platinum alloy electrode made by the alkaline reduction process in accordance with the present invention, the electrode was left in an acid electrolyte at room temperature continuously. Periodically the power was turned on to check the current/voltage stability of the electrode. The results of this experiment are shown in Table 7 below.

TABLE 7

Current and Cell Resistance with Ru-Pt Alloy Electrode made by Alkaline Reduction Process of the Present Invention

| Time (Hrs.) | Current (milliamps) | | | Cell Resistance Ohms |
| --- | --- | --- | --- | --- |
| | 1.6 volts | 1.8 volts | 2.0 volts | |
| 0 | 170 | 355 | 555 | 0.99 |
| 96 | 175 | 355 | 555 | 1.00 |
| 120 | 180 | 355 | 545 | 1.04 |

An examination of the data in Table 7 shows that the current and cell resistance held substantially constant for 120 hours.

EXAMPLE 9

The Tafel Slope was determined for various electrodes including the ruthenium-platinum alloy electrode made by the alkaline reduction process in accordance with the present invention. The Tafel Slope is indicative of an electrochemical reaction and is the Slope of the curve of voltage versus log i. A platinum electrode had a Tafel Slope of 120 millivolts at 25° C. A ruthenium-platinum reduced oxide electrode made by the Adams method had a Tafel Slope of 40 millivolts at 25° C. The ruthenium-platinum alloy electrode made by the alkaline reduction process in accordance with the present invention had a Tafel Slope of 30 millivolts at 25° C. Thus, the electrochemical characteristics of the cell having an electrode using the ruthenium-platinum alloy made by the alkaline reduction process of the present invention shows substantial improvement over the prior art electrodes.

An inexpensive electrode material has been prepared in accordance with the present invention. It has been demonstrated that the improved method for making finely-divided metal alloys and the finely-divided metal alloy made therefrom are substantial improvements over prior art alloys. It has been demonstrated that they are especially useful in catalytic processes. The alloys made by the alkaline reduction method in accordance with the present invention are substantially or completely free of oxides of the metals as demonstrated by the X-Ray diffraction data and yield data. The alkaline reduction reaction of the present invention can be easily controlled so that the process has broad application in the preparation of various metal alloys using various reducing agents and salts of metals. Furthermore, it is possible to obtain a superior alloy material at relatively low temperatures. No extra processing is required once the precipitate is formed by the alkaline reduction method of the present invention other than a separation of the precipitate from the solution with optional washing. No metal oxides are formed from the metals in the alkaline reduction method of the present invention. The catalysis for oxygen is comparable to that using a ruthenium electrode except the electrode made from the alloy in accordance with the present invention is much more stable. The ruthenium alloys of the present invention have the hexagonal symmetry of ruthenium indicative of a structure wherein the metal or metals used in the alloy are dissolved in the ruthenium. Thus, when platinum having face centered cubic symmetry is alloyed with ruthenium in accordance with the present invention, the alloy shows a hexagonal symmetry indicative of the dissolution of the platinum in the ruthenium. The face centered cubic symmetry of platinum is not present in the alloys of platinum and ruthenium when they are made in accordance with the present invention. The alloys made in accordance with the present invention retain the symmetry of ruthenium or both, indicative of the unusual alloy of a second metal or metals such as platinum or zirconium or tantalum and iridium dissolved in ruthenium.

While other modifications of the invention and variations thereof which may be employed within the scope of the invention have not been described, the invention is intended to include such modifications as may be embraced within the following claims.

What is claimed is:

1. A method of making a finely-divided metal alloy comprising the steps of:
   (a) mixing in aqueous solution the water-soluble salts of at least two metals and a first reducing agent in an amount and under conditions insufficient to reduce the metal salts in solution;
   (b) adding the aqueous solution of metal salts containing the first reducing agent to a caustic solution of a second reducing agent present in an amount sufficient to cause the reduction of the dissolved metal salts at elevated temperatures, whereby a precipitate of alloy of the metals in the metal salts forms in the solution; and
   (c) separating the precipitate from the solution.

2. The method of claim 1 wherein the metal salts are any water-soluble salts of at least any two different metals selected from the group consisting of Groups IV-B, V-B, VI-B, VII-B, VIII, I-B, II-B, III-B, IV-A, and V-A of the Periodic Chart of the Elements.

3. The method of claim 2 wherein the metal salts are ruthenium chloride and platinum chloride.

4. The method of claim 2 wherein the metal salts are ruthenium chloride and zirconium chloride.

5. The method of claim 1 wherein the first and second reducing agents are selected from the group consisting of formaldehyde, hydroxylamine, methanol, propanol, acetaldehyde, hydroquinone, propionaldehyde, sodium borohydride, methyl magnesium chloride, hydrazine, and mixtures thereof.

6. The method of claim 1 wherein the first reducing agent is formaldehyde, and the second reducing agent is hydrazine.

7. The method of claim 1 further comprising washing the precipitate with water and drying the precipitate.

8. A finely-divided metal alloy made by the steps of:
   (a) mixing in aqueous solution the water-soluble salts of at least two metals and a first reducing agent in an amount and under conditions insufficient to reduce the metal salts in solution;
   (b) adding the aqueous solution of metal salts containing the first reducing agent to a caustic solution of a second reducing agent present in an amount sufficient to cause the reduction of the dissolved metal salts at elevated temperatures, whereby a precipitate of alloy of the metals in the metal salts forms in the solution; and
   (c) separating the precipitate from the solution.

9. The metal alloy of claim 8 wherein the metal salts are any water-soluble salts of at least any two different metals selected from the group consisting of Groups IV-B, V-B, VI-B, VII-B, VIII, I-B, II-B, III-B, IV-A and V-A of the Periodic Chart of the Elements.

10. The metal alloy of claim 9 wherein the metal salts are ruthenium chloride and platinum chloride.

11. The metal alloy of claim 9 wherein the metal salts are ruthenium chloride and zirconium chloride.

12. The metal alloy of claim 8 wherein the first and second reducing agents are selected from the group consisting of formaldehyde, hydroxylamine, methanol, propanol, acetaldehyde, hydroquinone, propionaldehyde, sodium borohydride, methyl magnesium chloride, hydrazine, and mixtures thereof.

13. The metal alloy of claim 8 wherein the first reducing agent is formaldehyde, and the second reducing agent is hydrazine.

14. The metal alloy of claim 8 further comprising washing the precipitate with water and drying the precipitate.

15. A finely-divided alloy of ruthenium and at least one second metal comprising a solid solution of the second metal dissolved in ruthenium substantially free of the oxides of the second metal and ruthenium, said alloy being coprecipitated from the dissolved salts of ruthenium and the second metal and having a d-spacing of about 2.34 Angstrom units substantially the same d-spacing as pure ruthenium at the 100 hkl reflection and having a hexagonal symmetry greater than $c_o =$ about 4.28 Angstrom units as measured with copper-potassium-alpha radiation in X-ray powder diffraction.

16. The alloy of claim 15 wherein the second metal is a metal other than ruthenium selected from the group consisting of Groups IV-B, V-B, VI-B, VII-B, VIII, I-B, II-B, III-B, IV-A and V-A of the Periodic Chart of the Elements.

17. A finely-divided alloy of platinum and ruthenium comprising a solid solution of platinum dissolved in ruthenium substantially free of the oxides of platinum and ruthenium, said alloy being coprecipitated from the dissolved salts of platinum and ruthenium and having a d-spacing of about 2.35 Angstrom units substantially the same d-spacing as pure ruthenium at the 100 hkl reflection and having a hexagonal symmetry of about 4.40 Angstrom units as measured with copper-potassium-alpha radiation in X-ray powder diffraction.

18. A finely-divided alloy of zirconium and ruthenium comprising a solid solution of zirconium dissolved in ruthenium substantially free of the oxides of zirconium and ruthenium, said alloy being coprecipitated from the dissolved salts of zirconium and ruthenium and having a d-spacing of about 2.37 Angstrom units substantially the same d-spacing as pure ruthenium at the 100 hkl reflection and having a hexagonal symmetry greater than $c_o =$ about 4.28 Angstrom units as measured with copper-platinum-alpha radiation in X-ray powder diffraction.

19. A finely-divided alloy of ruthenium, tantalum and iridium comprising a solid solution of tantalum and iridium dissolved in ruthenium substantially free of the oxides of ruthenium, tantalum and iridium, said alloy being coprecipitated from the dissolved salts of ruthenium, tantalum and iridium and having a d-spacing of about 2.33 Angstrom units substantially the same d-spacing as pure ruthenium as measured with copper-potassium-alpha radiation in X-ray powder diffraction.

20. A finely-divided alloy of ruthenium and at least one second metal comprising a solid solution of the second metal dissolved in ruthenium substantially free of the oxides of the second metal and ruthenium, said alloy being coprecipitated from the dissolved salts of ruthenium and the second metal and having the hexagonal symmetry of ruthenium.

21. A finely-divided alloy of ruthenium and at least one second metal comprising a solid solution of the second metal dissolved in ruthenium substantially free of the oxides of the second metal and ruthenium, said alloy being coprecipitated from the dissolved salts of ruthenium and the second metal and having a d-spacing of the same as or of about the same magnitude as the d-spacing of ruthenium.

* * * * *